United States Patent [19]
Patton, III et al.

[11] Patent Number: 5,768,045
[45] Date of Patent: Jun. 16, 1998

[54] HARDWARE VELOCITY LIMIT CONTROL SYSTEM

[75] Inventors: Charles Royston Patton, III, Murrieta; Donald George Stupeck, Laguna Hills, both of Calif.

[73] Assignee: Western Digital Corporation, Irvine, Calif.

[21] Appl. No.: 575,659

[22] Filed: Dec. 20, 1995

[51] Int. Cl.$^6$ .................................................. G11B 5/55
[52] U.S. Cl. ................................... 360/78.04; 360/78.06
[58] Field of Search .................. 360/75, 78.04, 360/78.06

[56] References Cited

U.S. PATENT DOCUMENTS

| | | | |
|---|---|---|---|
| 4,755,892 | 7/1988 | Carteau et al. | 360/75 |
| 4,786,994 | 11/1988 | Carteau et al. | 360/75 |
| 4,864,437 | 9/1989 | Couse et al. | 360/75 |
| 4,933,785 | 6/1990 | Morehouse et al. | 360/78.04 |
| 5,231,549 | 7/1993 | Morehouse et al. | |
| 5,258,695 | 11/1993 | Utenick et al. | |
| 5,408,374 | 4/1995 | Morehouse et al. | |
| 5,495,156 | 2/1996 | Wilson et al. | 360/75 X |
| 5,566,369 | 10/1996 | Carobolante | 360/75 |

FOREIGN PATENT DOCUMENTS

| | | | |
|---|---|---|---|
| 537916-A2 | 4/1993 | European Pat. Off. | G11B 19/20 |
| WO 8908916 | 9/1989 | WIPO | G11B 21/02 |

*Primary Examiner*—Aristotelis M. Psitos
*Assistant Examiner*—James L. Habermehl
*Attorney, Agent, or Firm*—Leo J. Young; Milad G. Shara

[57] ABSTRACT

A self-contained disk drive actuator velocity controller for, independently of the disk drive microprocessor, placing the actuator into a velocity mode to slew the actuator to a pre-programmed velocity during parking, unparking, power interruption or microprocessor malfunction. The velocity controller may place the actuator into the velocity mode in response to a timeout signal that is generated in the event the microprocessor fails to update the current demand DAC within a predetermined timeout interval. The velocity controller may also place the actuator into the velocity mode in response to a supply power loss. In addition, the velocity controller may be triggered in response to a command from the microprocessor to park or unpark the actuator. The velocity controller monitors the BEMF generated by the actuator motor coil and adjusts the gain of the actuator motor driver accordingly until BEMF reaches a value that corresponds to the target velocity. The velocity controller measures the BEMF very accurately because it includes a nulling or calibration circuit that operates during tracking mode to nullify the effects of parasitic actuator coil resistance.

10 Claims, 3 Drawing Sheets

HARDWARE VELOCITY LIMIT CONTROL SYSTEM

BACKGROUND OF THE INVENTION

1. Field of the Invention

This invention relates generally to disk drives for computers and, more specifically, to circuitry for controlling the velocity of a disk drive actuator arm.

2. Description of the Related Art

A computer typically includes one or more hard disk drives that provide economical, non-volatile storage for relatively large quantities of data. A typical hard disk drive includes one or more platters or disks having magnetic recording surfaces, disk drive controller electronics, one or more actuator arms on which are mounted magnetic transducer heads, an actuator motor for moving the actuator arms, and a spin motor for rotating the disks. The disk drive may also include amplifier and driver circuitry for the heads and motors, respectively. A well-known type of actuator motor is known as a voice coil motor (VCM). In response to signals received from the controller, the VCM may swing an actuator arm and its transducer heads across the surface of the disk. The controller receives servo signals from certain transducer heads and uses those signals to determine the radial position of the heads on the disk. In response to this servo feedback, the controller may control the VCM in a manner that maintains the heads at a certain radial position. With the heads hovering in this position over the spinning disks, the controller may activate the heads to record data on the disks or read data from the disks. The controller stores data in concentric annular tracks on the disks by positioning the heads at radial positions corresponding to the tracks. Data are stored in sectors on each track.

The controller electronics typically include a microprocessor that operates in accordance with firmware instructions. The microprocessor controls the VCM in response to read and write commands it receives from the computer. The microprocessor controls the VCM by providing data to a digital-to-analog converter (DAC), the output of which is provided to the VCM driver. This DAC is known as the demand DAC.

The VCM operates in response to current through its coil. Moving the heads from one track to another is known as "slewing." To slew the heads from an initial track to a target track in the minimal amount of time but without overshooting the target track, the microprocessor increases the current provided to the VCM to accelerate the actuator as it leaves the initial track and then reverses the current provided to the VCM to decelerate the actuator as it approaches the target track. During such velocity slews, the heads may attain maximum velocities on the order of 2-3 meters (75-100 inches) per second. To maintain the heads over a certain track, the microprocessor calculates, in response to the servo signals, the current required to correct any deviation in position, and provides the correction current data to the demand DAC. Maintaining the heads over a track in this manner is known as "tracking." With a method called "embedded servo," when slewing or tracking, the microprocessor typically updates the demand DAC input register once per sector, which is each time the disks rotate one sector with respect to the heads.

Disk drives having actuators that operate in the above-described manner in response to a calculated current are said to operate in a "current mode." Certain disk drives are known that have a "velocity mode" instead of, or in addition to, a current mode. In such drives, the microprocessor provides the demand DAC with data representing a target velocity rather than a calculated current.

If the power supplied to the disk drive is interrupted during a slew, the controller cannot decelerate the actuator, and actuator inertia may continue moving it across the disk at high speed. Similarly, a microprocessor malfunction caused by, say, flawed microcode or a power glitch, may prevent the microprocessor from updating the demand DAC input register. If the current value in the demand DAC is not changed, the actuator is moved in response to the value that the microprocessor last loaded into the demand DAC input register. In addition, the actuator may continue moving in an uncontrolled manner if a malfunction occurs when the drive is unparked. When the drive is not in use, the heads are parked at the innermost position of the disk. A magnetic latch retains the actuator arm in the park position. When the computer activates the drive, the controller pulls the actuator out of the latch, thereby moving the heads onto the disk. The microprocessor does not begin decelerating the actuator via the demand DAC until the microprocessor begins to receive servo signals. To move the heads onto the disk, the microprocessor must cause sufficient current to reach the VCM to overcome the latch magnetic stiction. If a malfunction occurs, or if the latch stiction is high as a result of manufacturing variances, the actuator arm may fly all the way across the disk before the microprocessor can receive servo signals and update the demand DAC in response to them.

To avoid serious damage to the heads and actuator in the event of a power failure or other malfunction, disk drives have shock-absorbing crash stops at each extreme of the actuator travel path or stroke. The inner crash stop prevents the actuator arm from moving beyond the park position. The outer crash stop prevents the heads from going off the outer edge of the disk. When the actuator arm impacts the inner crash stop, the crash stop resiliently deflects toward the inner edge. Thus, a small annular area of the disk at its extreme inner edge is unusable for data storage.

It is desirable to minimize the potential for damage to the heads and actuator. It is also desirable to maximize the area of the disks usable for storage. The related problems and deficiencies are clearly felt in the art and are solved by this invention in the manner described below.

SUMMARY OF THE INVENTION

This invention is a self-contained disk drive actuator velocity controller, which is a circuit that is independent of the disk drive microprocessor, that places the actuator into a self-contained velocity mode in the event of a power interruption or other malfunction or during parking or unparking. The velocity controller of this invention may place the actuator into the self-contained velocity mode in response to a timeout signal that is generated in the event the microprocessor fails to update the demand DAC within a predetermined timeout interval. Alternatively, or in addition, this velocity controller may place the actuator into the self-contained velocity mode in response to a supply power loss. This velocity controller may thus provide actuator motor braking to reduce the velocity at which the actuator impacts the crash stops. Because this impact velocity may be minimized, the size of the crash stops may be correspondingly minimized, thereby enabling a greater portion of the disk surface to be used for data storage.

When this velocity controller is triggered, it slews the actuator to a pre-programmed target velocity. Although braking is an important objective, the target velocity may be either lower or higher than the actuator velocity when triggering occurs. Thus, the velocity controller of this invention may also be triggered in response to a command from the microprocessor to unpark the actuator. In this manner, this invention can be used to slew the actuator to a safe target velocity as soon as it is released from the magnetic latch onto the disk.

In an exemplary embodiment, to slew the actuator to the target velocity, this velocity controller monitors the back electromotive force (BEMF) generated by the actuator motor coil and accordingly adjusts the gain of the actuator motor driver until BEMF reaches a value that corresponds to the target velocity. The velocity controller can control the actuator motor in response to actuator motor BEMF because it measures the BEMF very accurately. This invention includes a nulling or calibration circuit that operates during tracking mode to nullify the effects of parasitic actuator coil resistance, which would otherwise hamper accurate BEMF measurement.

The foregoing, together with other features and advantages of this invention, will become more apparent when referring to the following specification, claims, and accompanying drawings.

BRIEF DESCRIPTION OF THE DRAWINGS

For a more complete understanding of this invention, reference is now made to the following detailed description of the embodiments illustrated in the accompanying drawings, wherein:

FIG. 2 comprising

DETAILED DESCRIPTION OF PREFERRED EMBODIMENTS

Figure 1:
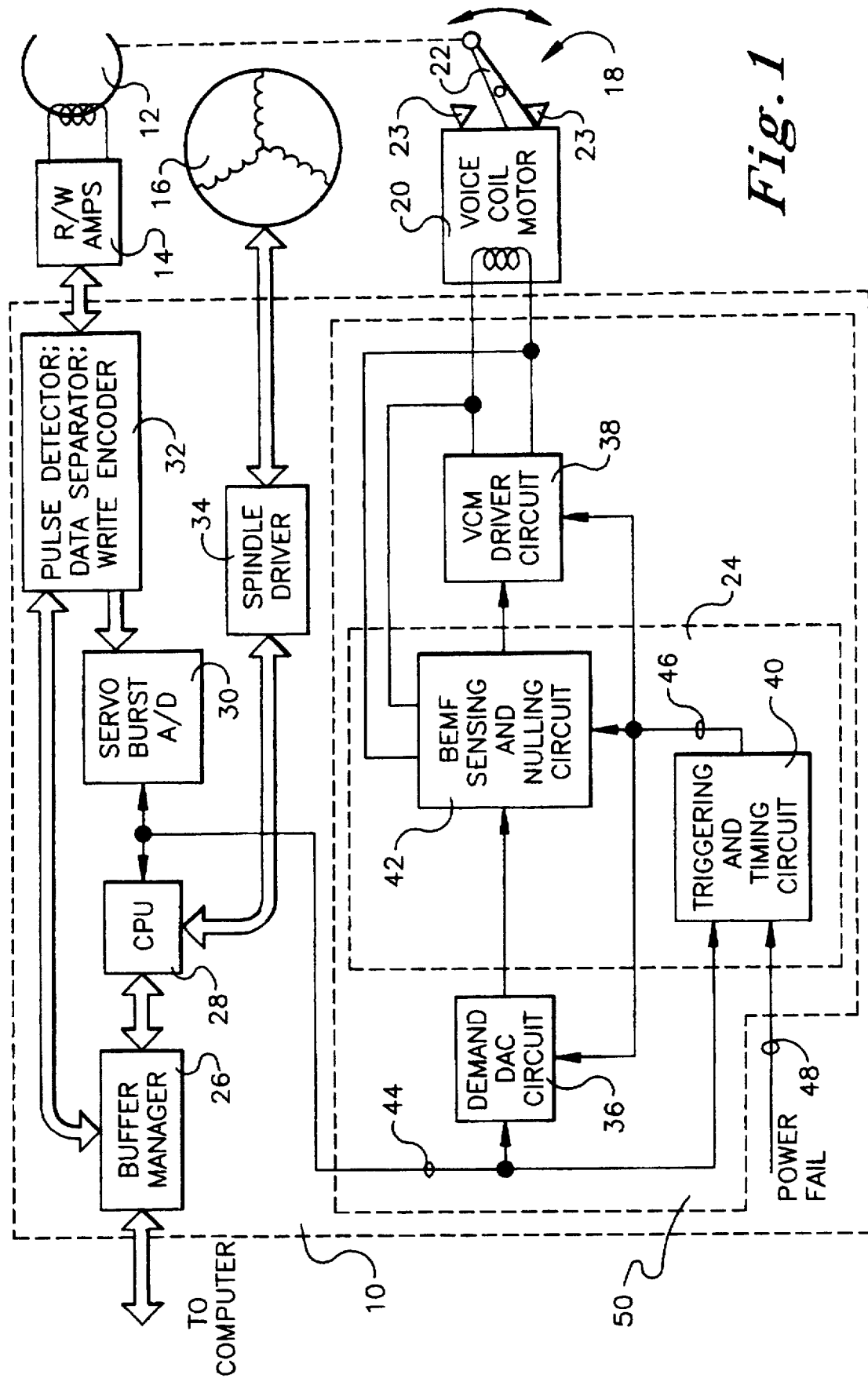
FIG. 1 is a block diagram illustrating the velocity controller of this invention in a typical disk drive.

As illustrated in FIG. 1, a disk drive includes disk drive electronics 10, a read/write head 12 and associated read/write amplifiers 14, a spindle motor 16, and an actuator 18. Actuator 18 includes an actuator motor 20 and an actuator arm 22. Actuator motor 20 is preferably a voice coil motor (VCM). The disk drive also includes a magnetically recordable disk, which is not shown for purposes of clarity. Spindle motor 16 rotates the disk, and actuator arm 22 can move head 12 across the disk to access the tracks on which data are recorded. The disk drive also includes shock-absorbing crash stops 23 at each extreme of the stroke of actuator arm 22.

Disk drive electronics 10 include a novel velocity controller 24 of this invention as well as electronic components of the types typically included in disk drives. These typical components include a buffer manager 26 for interfacing with a computer, a microprocessor 28 and associated program memory, a servo burst analog-to-digital (A/D) converter 30, head interface circuitry 32, a spindle motor driver 34, a demand digital-to-analog converter (DAC) circuit 36, and an actuator motor driver circuit 38. Because those of skill in the art are familiar with these latter components and their functions in a typical disk drive, they are described herein only in relation to velocity controller 24.

Velocity controller 24 is self-contained with respect to microprocessor 28 so that it can be independently triggered to initiate a velocity mode that overrides or is substituted for the current mode under which microprocessor 28 normally controls the velocity of actuator motor 20. Velocity controller 24 includes a triggering and timing circuit 40 and a back electromotive force (BEMF) sensing and nulling circuit 42. Until velocity controller 24 is triggered, BEMF sensing and nulling circuit 42 has no effect on the velocity of actuator motor 20 and passes the output of demand DAC circuit 36 through to the input of actuator motor driver circuit 38. In this normal current mode, by updating demand DAC 36 with current values, microprocessor 28 can maintain head 12 over a track or slew it to another track. Nevertheless, while the disk drive is tracking, BEMF sensing and nulling circuit 42 measures BEMF produced by actuator motor 20 and adjusts an internal gain value that compensates for or nulls the effect of parasitic actuator motor coil resistance on the measured BEMF, as described in further detail below with respect to FIG. 2. Thus, when velocity controller 24 switches disk drive electronics 10 from current mode to the self-contained velocity mode, BEMF sensing and nulling circuit 42 can immediately apply drive current to control actuator motor driver circuit 38 in response to the measured BEMF and velocity demand via demand DAC 36.

Triggering and timing circuit 40 can be triggered in three ways to switch disk drive electronics 10 from current mode to the self-contained velocity mode. Triggering and timing circuit 40 can be triggered in response to any failure of microprocessor 28 to timely update demand DAC circuit 36. Via a serial data line 44, triggering and timing circuit 40 receives the "load" command that microprocessor 28 generates to load a current demand value into demand DAC circuit 36. The "load" command resets triggering and timing circuit 40, as described in further detail below with respect to FIG. 2. If triggering and timing circuit 40 is not again reset in this manner before a predetermined time interval elapses, it produces a velocity mode signal 46.

Triggering and timing circuit 40 can also be triggered in response to a power failure. Triggering and timing circuit 40 also receives a power-fail signal 48. Disk drives commonly include a power-fail monitor (not shown in FIG. 1) that monitors the voltage supplied to the electronic components of the disk drive and produces power-fail signal 48 in response to detection of any power failure. In response to detection of power-fail signal 48, triggering and timing circuit 40 produces velocity mode signal 46.

Triggering and timing circuit 40 can also be triggered in response to a "park" command or an "unpark" command from microprocessor 28 to park and unpark actuator 18, respectively. When microprocessor 28 generates a "park" or "unpark" command, it signals triggering and timing circuit 40 via serial data line 44.

When controller 24 is triggered, demand DAC circuit 36 loads a predetermined velocity value into the DAC input register, thereby substituting it for the current value that microprocessor 28 previously loaded. Microprocessor 28 may store this predetermined velocity, which is preferably a relatively low velocity such as 0.25 meters (10 inches) per second, in demand DAC circuit 36 when disk drive is first powered-up or at any other suitable time. In velocity mode, BEMF sensing and nulling circuit 42 functions as a feedback circuit that measures actuator motor BEMF and adjusts actuator motor driver circuit 38 until the measured BEMF indicates that actuator motor 20 is operating at the predetermined velocity.

Although existing disk drives may be retrofitted to incorporate this invention, velocity controller 24 is preferably integrated with actuator motor driver 38 and demand DAC 36 in a custom integrated circuit 50. The input and output pins as well as various resistors and capacitors external to integrated circuit 50 are omitted from FIG. 1 for purposes of clarity.

Figure 2A:
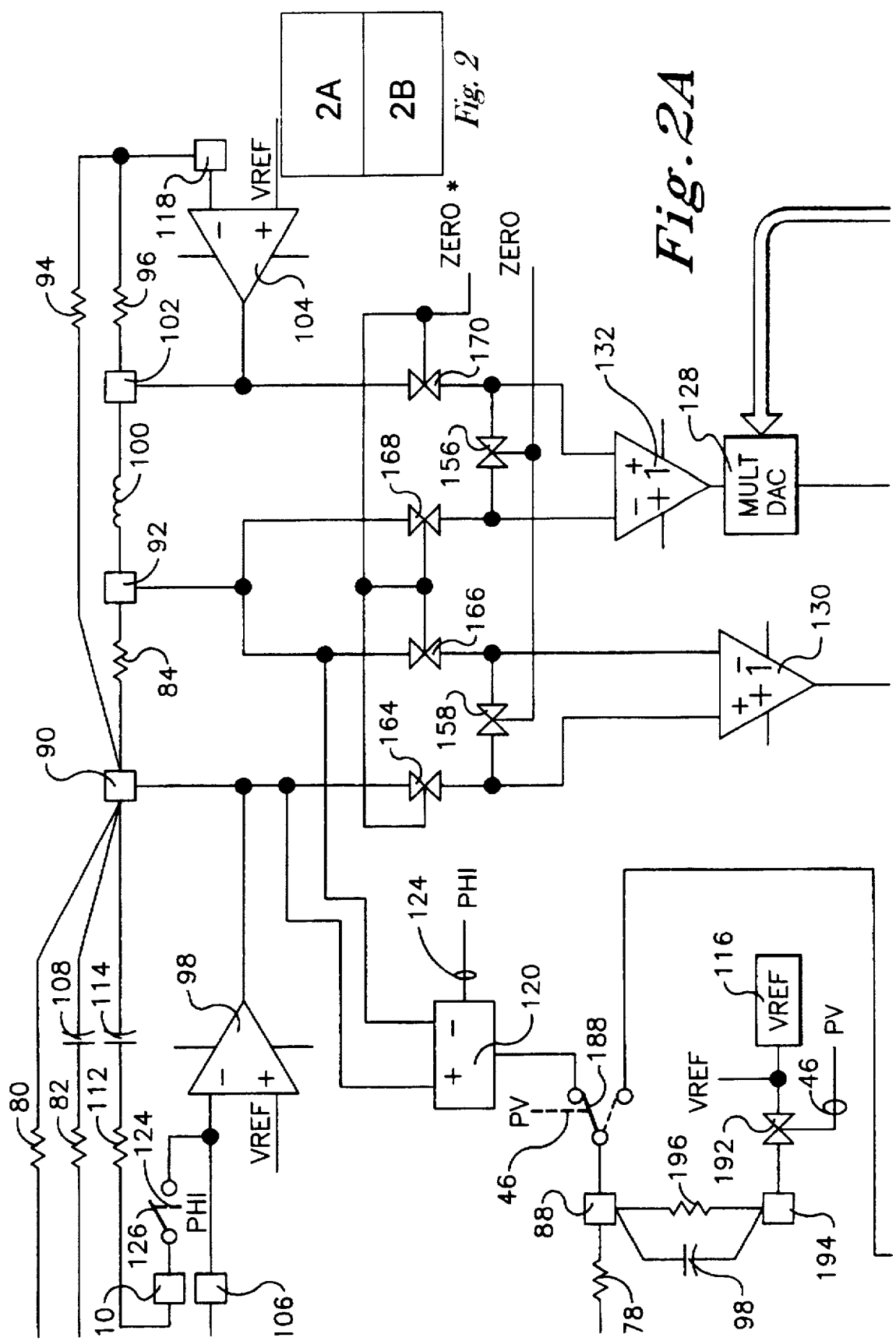
FIGS. 2A–2B, is a schematic diagram of an integrated velocity controller and actuator motor driver circuit of this invention.
Figure 2B:
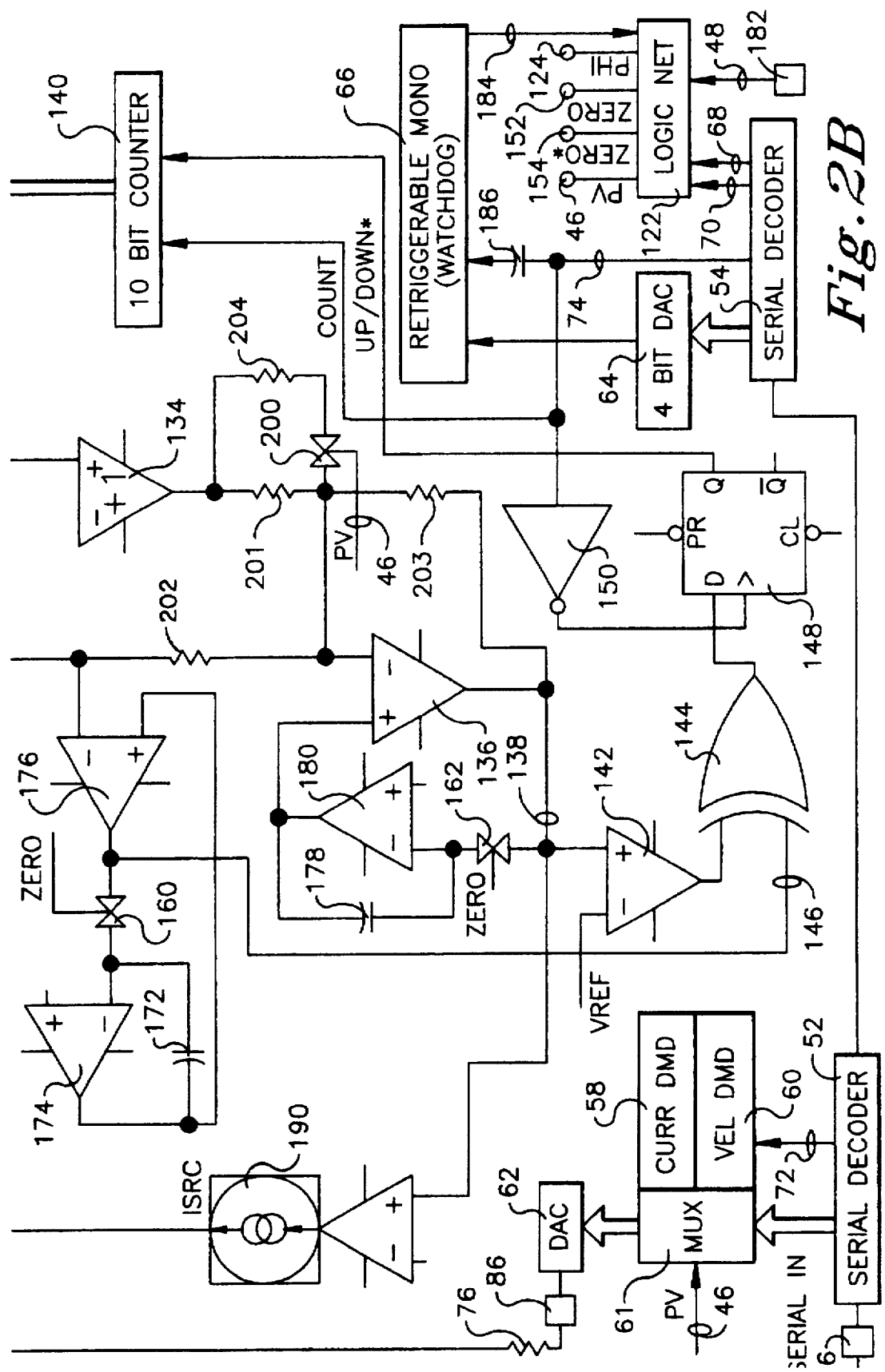

FIG. 2, comprising FIGS. 2A–2B, illustrates integrated circuit 50 in further detail. Serial decoders 52 and 54 receive serial data from a pin 56. Although data are preferably received in serial format from microprocessor 28 (FIG. 1) to minimize the pin count of integrated circuit 50, a parallel data format would also be suitable. Via serial decoder 52, microprocessor 28 can load a current value into a current register 58 and a velocity value into a velocity register 60. Current register 58 and velocity register 60 are preferably 10 bits wide (9 bits plus a sign bit). A multiplexer 61, controlled by velocity mode signal 46 (PV), selects current register 58 when velocity mode signal 46 indicates current mode and selects velocity register 60 when velocity mode signal 46 indicates velocity mode. The output of the selected register is loaded into a demand DAC 62. Also via serial decoder 54 and a four-bit DAC 64, microprocessor 28 can select the timing interval of a watchdog timer 66. As described below, microprocessor 28 should preferably select a timing interval slightly greater than the time required for head 12 to traverse one sector on the disk during tracking. Also via serial decoder 54, microprocessor 28 can control a watchdog inhibit signal 68 or a high/low current mode select signal 70.

Microprocessor 28 normally generates a "load" command to load a current value into current register 58 once per sector. Serial decoders 52 and 54 generate strobe signals 72 and 74, respectively, each time they receive a "load" command. DAC 62 produces a voltage that corresponds to the loaded current value. The amplifier circuit described below provides drive current to actuator motor 20 (FIG. 1) in response to the voltage produced by DAC 62. The manner in which this amplifier circuit drives actuator motor 20 in current mode is similar to that of typical actuator motor diver circuits known in the art and is not affected by velocity controller 24 (FIG. 1) in current mode.

The combined effect of six resistors 76, 78, 80, 84, 94 and 96 connected externally to integrated circuit 50 is to convert the current produced by DAC 62 into a current through coil 100. A resistor 82 and a capacitor 108 provide feedback loop stability. Resistor 76 is connected in series with resistor 78 across pins 86 and 88. One end of resistor 80 is connected to pin 90, and the other end is connected to a node between resistors 76 and 78. Resistor 84 is connected between pins 90 and 92. As those of skill in the art understand, the values of these resistors should be selected in accordance with the electrical specifications of actuator motor 20 to facilitate proper operation with actuator motor 20. Similarly, resistors 94 and 96, also connected externally to integrated circuit 50, should be selected to adjust the gain of the amplifier circuit such that amplifiers 98 and 104 have sufficient output swing and gain. Those of skill in the art are readily capable of selecting suitable values for these external resistors because they should be selected in the manner in which one would select external resistors for a typical actuator driver amplifier, such as the UC3173 Full Bridge Power Amplifier produced by Unitrode Integrated Circuits Corporation.

The transconductance amplifier circuit formed by amplifiers 98, 104 and 120 converts the voltage produced by DAC 62 into a current that drives the actuator motor coil 100 of actuator motor 20 (FIG. 1), which is connected across pins 92 and 102. Amplifier 104 is configured as a follower amplifier that follows the output of amplifier 98. The inverting input of amplifier 98 receives the voltage to be converted via pin 106, resistors 80 and 82 and capacitor 108 when tracking and, additionally, via pin 110, resistor 112 and capacitor 114 when slewing, as described further below. The non-inverting input of amplifier 98 receives a reference voltage (VREF) that is produced by a constant voltage source 116. Similarly, the inverting input of amplifier 104 receives the voltage to be inverted via resistor 94, which is connected across pins 118 and 90, and the non-inverting input receives VREF. Amplifier 120 senses the voltage across resistor 84, which is proportional to the current in coil 100, and feeds this voltage back to the amplifier circuit input via pin 88. Amplifier 120 is a switchable gain amplifier, preferably having a gain switchable to either 2.0 or 0.5. A suitable switchable gain amplifier is the UC3173 Full Bridge Power Amplifier produced by Unitrode Integrated Circuits Corporation.

Microprocessor 28 may assert high/low current mode select signal 70 via serial decoder 54 to initiate a low-current mode for tracking and may deassert high/low current mode select signal 70 to initiate a high-current mode for slewing. A logic network 122 asserts and deasserts a high/low range signal 124 (PHI) in response to assertion and deassertion, respectively, of high/low current mode select signal 70. Assertion of high/low range signal 124 switches the gain of amplifier 120 to 2.0 and opens an electronically controlled single-pole single-throw switch 126, and deassertion of high/low range signal 124 switches the gain of amplifier 120 to 0.5 and closes switch 126. Closing switch 126 decreases the high-frequency gain of amplifier 98, thereby stabilizing the closed loop gain of the system. Switching the gain of amplifier 120 from 2.0 to 0.5 causes the transconductance gain to increase by a factor of four, thereby increasing the current available for slewing. Switching the gain of amplifier from 0.5 to 2.0 causes the transconductance gain to decrease by a factor of four, thereby decreasing the available current. Decreasing the available current allows microprocessor 28 to provide finer control over current during tracking.

The voltage drop across actuator motor coil 100 does not provide a sufficiently accurate measurement of actuator motor BEMF to be used as a feedback control signal in velocity mode because the true actuator motor BEMF is buried in the voltage drop produced by the parasitic resistance of actuator motor coil 100. This parasitic resistance varies with temperature and manufacturing tolerances of actuator motor coil 100 and thus cannot be predicted with sufficient accuracy. To nullify the effect of parasitic resistance ($R_{coil}$) on actuator motor BEMF ($V_{BEMF}$), the gain (G) of a multiplier DAC 128 is adjusted during tracking in accordance with the following formula:

$$(I*R_{84})-(I*R_{coil}*G)+(G*V_{BEMF})=(G*V_{BEMF})+V_{err} \quad [\text{Eqn. 1}]$$

The final state of the right side of the equation is zero because, when coil 100 is tracking and thus has essentially zero velocity, $V_{BEMF}$ is zero. A signal corresponding to the error term ($V_{err}$) should therefore equal zero if $I*R_{84}$ equals $I*R_{coil}$. Because the same current (I) exists in both actuator motor coil 100 and resistor 84, resistor 84 is used as a sense resistor. A first operational amplifier (op-amp) circuit 130, which has a gain of +1, senses the voltage across resistor 84, which is represented by the term $I*R_{84}$ in the equation above, and a second op-amp circuit 132 senses the voltage across actuator motor coil 100, which corresponds to $I*R_{coil}$. Op-amp circuits 130 and 132 are preferably optimized for common mode rejection. Multiplier DAC 128 applies the gain (G) to the sensed voltage across actuator motor coil 100, thereby producing at the output of multiplier DAC 128 a signal corresponding to the term $I*R_{coil}*G$ in the equation above. A buffer amplifier 134 receives the output of multiplier DAC 128. A summing amplifier 136 subtracts the output of amplifier 134, which has a value of $G*(I*R_{coil}+$ $V_{BEMF}$) from the output of amplifier 130, which has a value of $I*R_{84}$, to yield the signal 138 that corresponds to the term $(G*V_{BEMF})+V_{err}$ in the equation above. Because $V_{BEMF}$ is zero, $V_{err}$ represents the lack of equality between the terms $I*R_{84}$ and $I*R_{coil}*G$ in the equation above.

A 10-bit counter 140 generates the gain and provides it to multiplier DAC 128. The initial value of this counter is unimportant because it begins counting immediately upon initiation of tracking and quickly arrives at the proper gain in the following manner. A comparator 142 compares error signal 138 to VREF and produces an output that indicates whether the error signal 138 is positive or negative. An exclusive-OR gate 144 receives the output of comparator 142 and a sign signal 146 that represents the direction of current through actuator coil 100. The output of exclusive-OR gate 144 indicates the direction of signal 138 with respect to the direction of current in actuator coil 100. A flip-flop 148, clocked by strobe signal 74 via an inverter 150, latches the output of exclusive-OR gate 144 and provides it to the up/down input of counter 10. Counter 140 counts each time microprocessor 28 loads a new current value into demand DAC 62 because the clock input of counter 140 also receives strobe signal 74. Thus, counter 140 counts upward to increase gain and downward to decrease gain. Only the five highest-order bits plus the sign bit of counter 140 are provided to multiplier DAC 128 to integrate the counts and thereby avoid changing multiplier DAC 128 in response to noise.

It should be noted that, although multiplier DAC 128 preferably applies the gain to the sensed voltage across actuator motor coil 100, in other embodiments, a multiplier DAC or other device having a selectable gain could apply the gain to the sensed voltage across resistor 84. Such a configuration would be suitable because the error signal need only be responsive to the ratio of the gains of the voltages sensed across actuator motor coil 100 and resistor 84, rather than to the gain applied to either voltage by itself.

It is important to obtain accurate measurements of the voltages across actuator coil 100 and resistor 84 because small differences in their magnitudes may determine the direction in which counter 140 must count. Therefore, auto-zeroing circuitry is included to compensate for the offset voltages of amplifiers 130, 132, 134, 136 and 176. Periodically during tracking, logic network 122 asserts a ZERO signal 152 and its complement ZERO* signal 154. ZERO signal 152 is provided to analog gates 156, 158, 160 and 162. ZERO* signal 154 is provided to analog gates 164, 166, 168 and 170. Analog gates 156–170 are preferably metal-oxide semiconductor field-effect transistors (MOSFETs), but bipolar devices may also be suitable. When ZERO signal 152 and ZERO* signal 154 are asserted, the sum of the offset voltages of amplifiers 130 and 176 is stored in a sample-and-hold circuit that includes an amplifier 174 and a capacitor 172. Similarly, when ZERO signal 152 and ZERO* signal 154 are asserted, the sum of the offset voltages of amplifiers 130, 132, 134 and 176 is stored in a sample-and-hold circuit that includes an amplifier 180 and a capacitor 178. When ZERO signal 152 and ZERO* signal 154 are deasserted, the offset voltage stored on capacitor 178 is reinserted at the input of summing amplifier 136. The offset voltage stored on capacitor 172 is fed back into amplifier 176, which uses it to detect the direction of current in coil 100. Amplifier 176 produces sign signal 146, which represents the detected current direction.

Logic network 122 asserts velocity mode signal 46 when any one of the three triggering conditions described above with respect to FIG. 1 occurs. With respect to FIG. 2, logic network 122 generates velocity mode signal 46 in response to power-fail signal 48, which it receives via pin 182, and in response to a timeout signal 184, which it receives from watchdog timer 66. Watchdog timer 66 is a retriggerable monostable multivibrator that generates timeout signal 184 unless it is retriggered by strobe signal 74, which is AC coupled to its retrigger input via a capacitor 186. Normally, microprocessor 28 updates current register 58 once per sector. Thus, to initiate velocity mode upon failure of microprocessor 28 to update current register 58, watchdog timer 66 should have a timing interval slightly longer than the time required to traverse one sector. In addition, logic network 122 generates velocity mode signal 46 in response to watchdog inhibit signal 68, which microprocessor 28 can assert via serial decoder 54. In response to assertion of watchdog inhibit signal 68, logic network 122 asserts velocity mode signal 46 regardless of the state of timeout signal 184. Microprocessor 28 may thus assert watchdog inhibit signal 68 to initiate velocity mode when parking or unparking.

Assertion of velocity mode signal 46 sets an electronically controlled single-pole double-throw switch 188 to the position shown in dashed line in FIG. 2. When switch 188 is in this position, amplifier 120, which provides feedback into the amplifier circuit as described above, is disconnected from the amplifier circuit. An output transconductance amplifier 190, which provides current proportional to error signal 138, is switched into the feedback path in place of amplifier 120. Assertion of velocity mode signal 46 also switches multiplexer 61 to select velocity register 60. As described above, velocity register 60 is pre-loaded with a value representing the target velocity. Assertion of velocity mode signal 46 also closes an analog gate 192, which is preferably a MOSFET. Closure of analog gate 192 provides VREF at pin 194, through which a resistor 196 and a capacitor 198 are connected into the feedback path. Resistor 196 and capacitor 198 together function as an integrator that rolls the response of amplifier 190 off at higher frequencies to optimize stability.

Assertion of velocity mode signal 46 also closes an analog gate 200, which is preferably a MOSFET, to provide stability in the manner described below. Three resistors 201, 202 and 203 together with amplifier 136 form an inverting gain stage, summing the signals of amplifier 130 and gain modified amplifier 132. Because the values of the resistance of actuator motor coil 100 and resistor 84 are preferably in the ratio of 30:1 or more, it is necessary to provide this correction to the gain ratio in the summer. The gain G in the equation above is thus actually the product of the gain of multiplier DAC 128 and the ratio of the value of resistor 203 divided by the value of resistor 201. Furthermore, the gain of the signal produced by amplifier 130 is multiplied by the ratio of the value of resistor 203 to the value of resistor 202. The final equation is:

$$(I*R_{84})\frac{R_{203}}{R_{202}} - (I*R_{coil} + V_{BEMF}) * \qquad \text{[Eqn. 2]}$$

$$G\frac{R_{203}}{R_{201}} = V_{err} + \left(V_{BEMF} * G\frac{R_{203}}{R_{201}}\right)$$

The final equation at null, where $V_{err}$ goes to zero, is:

$$(I*R_{84})\frac{R_{203}}{R_{202}} - (I*R_{coil} + V_{BEMF}) * \qquad \text{[Eqn. 3]}$$

-continued $$G\frac{R_{203}}{R_{201}} = V_{BEMF} * G\frac{R_{203}}{R_{201}}$$

Another way to view the effect of the nulling action is that in the velocity mode, the feedback signal from amplifier 130 causes a cancellation of the real resistance of actuator motor coil 100 by adding in negative resistance. If this real resistance were not canceled out, the velocity control circuit would not provide enough current to stop the actuator in time under certain conditions of high speed slewing toward the inner crash stop. When null is reached, the balance point deters about real and negative resistance. If the circuit is switched to velocity mode while the null balance is slightly to the negative resistance direction, the result is a large hysteresis in the velocity control an undesirable condition. Therefore, in response to assertion of velocity mode signal 46 (PV), analog switch 200 switches an additional resistor 204 into the circuit in parallel with resistor 201. The change in resistance causes the null to unbalance in the direction of real resistance, which is the direction of linear stability. The amount of unbalance is limited to about two percent. This amount guarantees it to be larger than the dither error but less than the amount impairing the performance of the velocity control.

In velocity mode, the sensed BEMF is used in the manner described above to provide feedback for controlling actuator motor velocity. BEMF can be sensed with sufficient accuracy to achieve this objective because the portion of the actuator coil voltage caused by parasitic resistance is nulled. Velocity mode may be initiated in response to a power failure or a microprocessor malfunction. Velocity mode may also be initiated during parking to ensure that actuator velocity is at a safe level when actuator 18 reaches park position, and during unparking to ensure actuator velocity does not exceed a safe level immediately after actuator 18 is released onto the disk. Because this invention limits the maximum velocity at which actuator arm 22 can impact crash stops 23, crash stops 23 need not provide as great a cushioning effect as conventional crash stops. Crash stops 23 thus may be smaller than conventional crash stops, thereby enabling a greater portion of the disk surface to be used for data storage.

Clearly, other embodiments and modifications of this invention will occur readily to those of ordinary skill in the art in view of these teachings. For example, although in the illustrated embodiment velocity controller 24 is integrated with demand DAC circuit 36 and actuator motor driver circuit 38 in integrated circuit 50, alternatively, an existing disk drive, including its existing demand DAC circuit and actuator motor driver circuit, may be modified to incorporate the velocity controller of this invention as a separate circuit device. Therefore, this invention is to be limited only by the following claims, which include all such other embodiments and modifications when viewed in conjunction with the above specification and accompanying drawings.

We claim:

1. In a disk drive having a servo system including a microprocessor, an actuator, an actuator motor with a coil having a resistance subject to variation, and a driver circuit for supplying current to flow through the coil and a sense resistor, the disk drive having multiple modes of operation including a first mode in which the velocity of the actuator is essentially zero, and a second mode in which the velocity of the actuator is non-zero and substantially constant, a controller for operating independently of the servo system during the second mode to cause the actuator to move with a predetermined velocity, the controller comprising:

a sensing circuit having first and second signal inputs, a control input, and an output, the first signal input being responsive to a voltage developed across the sense resistor and the second signal input being responsive to a voltage developed across the coil; the output providing a velocity-representing signal that represents the velocity of the actuator when an appropriate calibration value is received at the control input;

a calibration circuit including memory means, means responsive to the contents of the memory means for producing the calibration value, means operative during the first mode for repeatedly adjusting the content of the memory means, and the memory means retaining its contents during the second mode; and circuit means operative during the second mode for supplying the velocity-representing signal to the driver circuit.

2. The controller of claim 1, and further comprising:

a trigger circuit coupled to the microprocessor for producing a trigger signal in response to each command received from the microprocessor;

a timer initiated by each trigger signal for producing a timeout signal to initiate the second mode if a predetermined time interval elapses before an ensuing trigger signal.

3. The controller of claim 1, wherein the sensing circuit includes a multiplier circuit having an adjustable gain, and wherein the contents of the memory means varies during the first mode to establish the gain and remains constant during the second mode to maintain the gain.

4. The controller of claim 3, wherein the memory means is a counter.

5. The controller of claim 4, wherein the multiplier circuit is a multiplier DAC.

6. The controller of claim 5, and further comprising:

a trigger circuit coupled to the microprocessor for producing a trigger signal in response to each command received from the microprocessor;

a timer initiated by each trigger signal for producing a timeout signal to initiate the second mode if a predetermined time interval elapses before an ensuing trigger signal.

7. In a disk drive having a servo system including a microprocessor, an actuator, an actuator motor with a coil having a resistance subject to variation, and a driver circuit for supplying current to flow through the coil and a sense resistor, the disk drive having multiple modes of operation including a first mode in which the velocity of the actuator is essentially zero, and a second mode in which the velocity of the actuator is non-zero and substantially constant, a controller for operating independently of the servo system during the second mode to cause the actuator to move with a predetermined velocity, the controller comprising:

a sensing circuit having first and second signal inputs, a control input, and an output, the first signal input being responsive to a voltage developed across the sense resistor and the second signal input being responsive to a voltage developed across the coil; the output providing a velocity-representing signal that represents the velocity of the actuator when an appropriate calibration value is received at the control input;

a calibration circuit including memory means, means responsive to the contents of the memory means for producing the calibration value, means operative during the first mode for repeatedly adjusting the content of the memory means, and the memory means retaining its contents during the second mode;

circuit means operative during the second mode for supplying the velocity-representing signal to the driver circuit;

the sensing circuit including:
- a summing circuit for defining the velocity-representing signal;
- a first circuit path connected between the first signal input and the summing circuit;
- a second circuit path connected between the second signal input and the summing circuit; and
- the second circuit path including a multiplier circuit having a gain that depends upon the calibration value and including a switchable gain adjusting circuit that has a first gain during the first mode and a second gain during the second mode.

8. The controller of claim 7, wherein the switchable gain adjusting circuit includes a resistor and a gating circuit.

9. The controller of claim 7, wherein the contents of the memory means varies during the first mode to establish the gain and remains constant during the second mode to maintain the gain.

10. The controller of claim 7, and further comprising:
- a trigger circuit coupled to the microprocessor for producing a trigger signal in response to each command received from the microprocessor;
- a timer initiated by each trigger signal for producing a timeout signal to initiate the second mode if a predetermined time interval elapses before an ensuing trigger signal.

* * * * *